Figure 1:
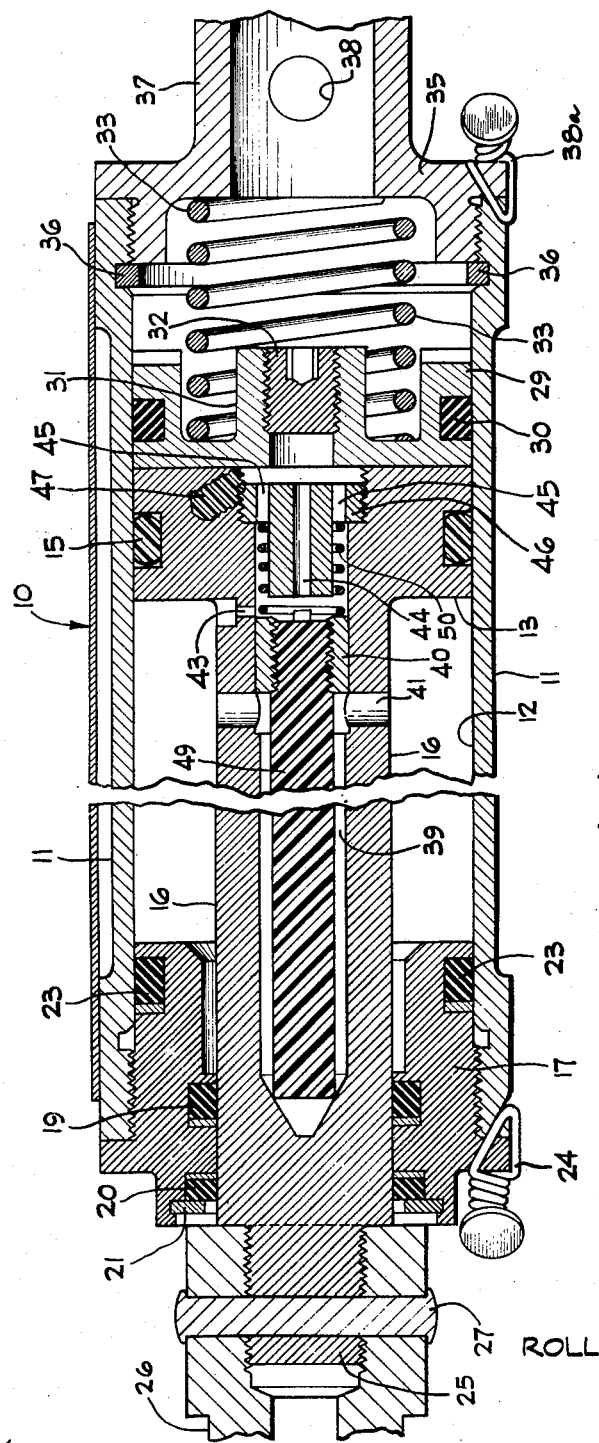

Aug. 11, 1959 R. D. RUMSEY 2,899,023
DAMPER WITH THERMOSTATIC VALVE
Filed March 27, 1957

INVENTOR.
ROLLIN D. RUMSEY

ATTORNEYS

United States Patent Office 2,899,023
Patented Aug. 11, 1959

2,899,023

DAMPER WITH THERMOSTATIC VALVE

Rollin Douglas Rumsey, Buffalo, N.Y., assignor to Houdaille Industries, Inc., Buffalo, N.Y., a corporation of Michigan Application March 27, 1957, Serial No. 648,936

3 Claims. (Cl. 188—96)

This invention relates to improvements in dampers and more particularly relates to improvements in linear dampers particularly adapted for use in damping the vibration of the movable parts of aircraft.

A principal object of the invention is to provide an improved form of damper arranged to effectively damp at low vibration rates and to lock the parts from movement at high vibration rates.

A further object of the invention is to provide a novel and improved damper having a restricted orifice, metering damping fluid from one side of the damper piston to the other at low rates of movement of the damper, together with an orifice control valve closing off the orifice by pressure on the valve at high rates of movement of the damper.

A still further object of the invention is to provide an improved form of linear damper having a piston and piston rod movable within a cylindrical damping chamber, having a restricted orifice affording communication from one side of the piston to the other, together with a piston valve varying the size of the orifice in accordance with temperature changes to provide a relatively constant damping effect over a wide range of temperature changes, in which the pressure of fluid in the damping chamber acts on the valve to entirely close the valve and lock the piston at high rates of motion of the piston with respect to its cylinder.

Another object of the invention is to provide an improved form of damper having a piston and piston rod movable within a cylindrical damping chamber, having a metering orifice leading through the piston rod and affording communication from one side of the piston to the other, together with a piston movably mounted within the piston rod and a linearly expansible rod operable to move the piston to vary the size of the metering orifice as a function of temperature, to provide a relatively constant pressure drop across the orifice at low rates of motion, and to accommodate fluid under pressure acting on the piston valve to completely close off the damper and lock the piston at high rates of motion.

These and other objects of the invention will appear from time to time as the following specification proceeds and with reference to the accompanying drawing wherein:

Figure 1 is a longitudinal sectional view taken through a damper constructed in accordance with the invention.

In the embodiment of the invention illustrated in the drawing, reference character 10 designates generally a direct acting damper of the linear type capable of damping vibration in aircraft at low rates of motion and locking the parts from movement at high rates of motion.

The damper 10 comprises an elongated housing 11 having an inner cylindrical wall 12 having a piston 13 movable therein and sealed to the wall 12 as by an O-ring 15.

The piston 13 has a piston rod 16 extending therefrom and slidably mounted in an end closure member 17 for the piston rod end of the housing 11, and sealed thereto as by sealing means 19 recessed within said end closure member and engaging said piston rod. A sealing ring 20 spaced outwardly from the sealing means 19 serves as a rod scraper and is retained to the end of the end closure member 17 as by a retaining ring 21. The end closure member 17 is shown as abutting the end wall of the housing 11 and as extending inwardly along the cylindrical wall 12 and as being sealed thereto as by a sealing ring 23. A lock wire 24 extending through registering apertured portions in the housing 11 and end closure member 17 is provided to lock said end closure member to said housing.

The piston rod 16 has a reduced outer end portion 25 to which is pivoted a connector 26, as by a pivot pin 27. The connector 26 may be connected with a movable part of an aircraft or the like to damp vibration at low rates of motion and to lock the parts from movement at high rates of motion.

The head end of the cylinder or housing 11 is closed by a replenishing piston 29 sealed to the wall 12 of said housing by a sealing ring 30. The replenishing piston 29 has an annular boss 31 extending outwardly from the face thereof having a removable plug 32 threaded therein to accommodate filling of the damper with damping fluid.

The replenishing piston 29 is biased toward the damping piston 13 by a compression spring 33 seated on the piston 29 at one end and on a hollow end cap 35 at its opposite end. The end cap 35 is threaded within the end of the housing 11 into engagement with a ring 36, which may be snapped within the cylindrical wall 12 of said housing. The end cap 35 is shown as having a cylindrical wall portion 37 extending outwardly therefrom and transversely drilled, as indicated by reference character 38, and affording a means for connecting the head end of the damper to a movable or stationary part of an aircraft or the like. A lock wire 38a locks said end cap to said housing.

The piston 13 and piston rod 16 are shown as being drilled from the head end of said piston along said piston rod for a substantial part of the length thereof. The axially drilled portion of said piston rod forms a passageway or chamber 39 for a piston valve 40, mounted within said chamber for axial movement therealong. The piston rod 16 is cross drilled as indicated by reference character 41 to supply fluid under pressure to the piston valve 40 to move said piston valve at high rates of motion toward the piston 13 and close off a metering orifice 43, leading through said piston rod.

Communication is afforded from the piston rod to the head end of the damping chamber through the metering orifice 43 and passageways 44 and 45 in a spring retainer plug 46, threaded within the piston 13 from the head end of said piston and retained in position in said piston by an expansible locking plug 47, which may be made from nylon or a like material.

The piston valve 40 is shown as being threaded on a rod 49 extending along the passageway or chamber 39 and seated at its inner end in the inner end of said passageway. The rod 49 is biased into engagement with the inner end of the passageway 39 by a compression spring 50, encircling a reduced diameter portion of the spring retainer plug 46, and seated at one end on said retainer plug, and at its opposite end on the end of the piston valve 40. The spring 50, besides biasing the rod 49 into engagement with the inner end of the passageway or chamber 39, also balances the pressure of fluid acting on the piston valve 40 through the cross drilled passageways 41, and holds said valve from moving to block off the metering orifice 43, except upon high rates of motion of the damper.

The rod 49 has a higher linear coefficient of expansion than the linear coefficient of expansion of the piston rod 16 and may be made from a nylon thermoplastic material. The rod 49 may also be made from metal or any other material having a higher linear coefficient of expansion than the linear coefficient of expansion of the piston rod 16.

The rod 49 having a higher linear coefficient of expansion than the linear coefficient of expansion of the piston rod 16, thus varies the size of the metering orifice 43 as a function of temperature, to provide a relatively constant pressure drop across the orifice 43 at low rates of motion. The rod 49 also assures that the orifice 43 will be closed off at high rates of motion under conditions of approximately the same rates of motion over a wide range of temperature variations.

It may be seen from the foregoing that at low rates of motion, damping fluid will flow through the metering orifice 43 from the piston rod end to the head end of the piston 13 through the passageways 44 and 45, as the piston rod 16 is extensibly moved with respect to the housing 11. As, however, the piston rod 16 is retractibly moved with respect to the housing 11, damping fluid will flow from the head end of the piston 13 to the piston rod end thereof, through the passageways 44 and 45 and into the damping chamber of increasing volume through the metering orifice 43.

It may further be seen that at low rates of motion the expansible rod 49 and piston valve 40 will vary the cross-sectional area of the metering orifice 43 in accordance with temperature variations, to provide a relatively constant damping effect over a wide range of temperature variations.

As, however, the piston rod 16 is rapidly extended from the housing 11, the pressure acting on the inner end of the piston valve 40 through the cross drilled passageways 41 will tend to over-balance the spring 50, and when the pressure on said piston valve is sufficient to overbalance said spring, the pressure on said piston valve will close off the orifice 43 and lock the piston 13 and piston rod 16 from further extensible movement with respect to the housing 11.

It may still further be seen that at high rates of motion, the expansible rod 49 will vary the position of the end of the piston valve 40 with respect to the orifice 43 as the temperature changes, to assure that the orifice 43 be closed off under conditions of approximately the same rates of motion of the piston rod 16 with respect to the housing 11 over a wide range of variations in temperature.

It will be understood from the foregoing that various modifications and variations in the present invention may be effected without departing from the spirit and scope of the novel concepts thereof.

I claim as my invention:

1. A linear damper comprising a housing having a cylindrical inner wall defining a damping chamber, a piston within said damping chamber having a piston rod extending from one end of said housing, a passageway extending axially along said piston and piston rod from the head end of said piston and terminating short of the outer end of said piston rod, a metering orifice leading through said piston rod to said passageway, a piston valve mounted in said passageway for axial movement therealong, a linearly expansible rod extending along said passageway and abutting the inner end thereof at one end and having said piston valve mounted on its opposite end for varying the cross-sectional area of said orifice in accordance with variations in temperature, to provide a substantially constant damping effect over a wide range of temperature variations, a passageway leading through said piston rod to said axial passageway extending therealong, on the opposite side of said piston valve from said orifice, and affording a means to supply fluid under pressure to said piston valve to close off said orifice upon predetermined high rates of motion of said piston with respect to said housing.

2. A linear damper comprising a housing having a cylindrical inner wall defining a damping chamber, a piston within said damping chamber having a piston rod extending from one end of said housing, a passageway extending axially along said piston and piston rod from the head end of said piston and terminating short of the outer end of said piston rod, a metering orifice leading through said piston rod to said passageway, a piston valve mounted in said passageway for axial movement therealong, a linearly expansible rod extending along said passageway and abutting the inner end thereof at one end and having said piston valve mounted on its opposite end for varying the cross-sectional area of said orifice in accordance with varaitions in temperature, to provide a substantially constant damping effect over a wide range of temperature variations, a passageway leading through said piston rod to said axial passageway extending therealong, on the opposite side of said piston valve from said orifice, and affording a means to supply fluid under pressure to said piston valve to close off said orifice upon predetermined high rates of motion of said piston with respect to said housing, and spring means balancing said piston valve and retaining said piston valve from closing off said orifice, except at predetermined high rates of motion of said piston with respect to said housing.

3. In a linear damper, a housing having a cylindrical inner wall defining a damping chamber, a piston within said damping chamber having the piston rod extensible from one end of said housing, a restricted orifice for metering the flow of damping fluid from one side of said piston to the other upon movement of said piston along said damping chamber, piston valve means for varying the size of said metering orifice at low rates of motion of said piston with respect to said damping chamber and closing off said orifice at predetermined high rates of motion of said piston with respect to said damping chamber, temperature responsive means having connection with said piston valve means to provide a substantially constant damping effect through said damping orifice at low rates of motion of said piston with respect to said cylinder, a pressure passageway leading to the opposite side of said piston valve means from said orifice to apply pressure to said piston valve means in a direction to effect the closing off of said orifice at high rates of motion of said piston, spring means for balancing said piston valve means and retaining said piston valve means from closing off said orifice except at predetermined high rates of damping motion, said temperature responsive means cooperating with said spring means to assure the closing off of said damping orifice at approximately the same high rates of motion of said piston over a wide range of temperature variations References Cited in the file of this patent

UNITED STATES PATENTS

| 2,043,465 | Clifford | June 9, 1936 |
| 2,161,811 | Grebe | June 13, 1939 |
| 2,240,644 | Focht | May 6, 1941 |
| 2,378,417 | Linsley | June 19, 1945 |
| 2,742,113 | O'Connor | Apr. 17, 1956 |

FOREIGN PATENTS

| 517,644 | Canada | Oct. 18, 1955 |